(12) United States Patent
Chang et al.

(10) Patent No.: US 9,776,613 B2
(45) Date of Patent: Oct. 3, 2017

(54) ABNORMAL DETECTING SYSTEM AND METHOD FOR A PNEUMATIC BRAKE

(71) Applicant: Automotive Research & Testing Center, Changhua County (TW)

(72) Inventors: Liang-Cheng Chang, Changhua County (TW); Jiun-Jie Chen, Changhua County (TW); Hsien-Yu Kuo, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 68 days.

(21) Appl. No.: 14/965,913

(22) Filed: Dec. 11, 2015

(65) Prior Publication Data

US 2017/0166180 A1  Jun. 15, 2017

(51) Int. Cl.
| | |
|---|---|
| *B60T 17/22* | (2006.01) |
| *B60T 8/88* | (2006.01) |
| *B60T 7/04* | (2006.01) |
| *B60T 8/171* | (2006.01) |
| *B60T 15/02* | (2006.01) |

(Continued)

(52) U.S. Cl.
CPC ............ *B60T 17/221* (2013.01); *B60T 7/042* (2013.01); *B60T 8/171* (2013.01); *B60T 8/885* (2013.01); *B60T 15/027* (2013.01); *B60T 17/22* (2013.01); *B60T 13/662* (2013.01); *B60T 13/683* (2013.01); *B60T 2220/04* (2013.01); *B60T 2270/40* (2013.01); *B60T 2270/402* (2013.01); *B60T 2270/403* (2013.01)

(58) Field of Classification Search
CPC ...... B60T 17/221; B60T 15/027; B60T 7/042; B60T 8/171; B60T 2270/40; B60T 2270/402; B60T 2270/403
See application file for complete search history.

(56) References Cited

U.S. PATENT DOCUMENTS

| | | | | |
|---|---|---|---|---|
| 4,121,873 A | * | 10/1978 | Durling | ................... B60T 15/20 303/40 |
| 5,328,251 A | * | 7/1994 | Brearley | ................. B60T 17/22 303/16 |

(Continued)

FOREIGN PATENT DOCUMENTS

| | | |
|---|---|---|
| CN | 102133892 B | 12/2013 |
| CN | 102529932 B | 10/2014 |
| TW | I312324 B | 7/2009 |

*Primary Examiner* — Dale W Hilgendorf
(74) *Attorney, Agent, or Firm* — CKC & Partners Co., Ltd.

(57) ABSTRACT

An abnormal detecting system for a pneumatic brake includes a pedal stroke sensor, a front chamber pressure sensor, a rear chamber pressure sensor, a storage unit pressure sensor, a parking brake switch and an abnormal detecting circuit. A pedal stroke signal, a front chamber pressure signal, a rear chamber pressure signal, an air storage unit pressure and a parking brake control signal are output. The abnormal detecting circuit receives the pedal stroke signal, the front chamber pressure signal, the rear chamber pressure signal, the air storage unit pressure signal and the parking brake control signal. The abnormal detecting circuit compares the pedal stroke signal with the front chamber pressure signal or the rear chamber pressure signal and then outputs a first abnormal signal; and the abnormal detecting circuit compares the parking brake control signal and then outputs a second abnormal signal.

13 Claims, 9 Drawing Sheets

(51) Int. Cl.
*B60T 13/66* (2006.01)
*B60T 13/68* (2006.01)

(56) References Cited

U.S. PATENT DOCUMENTS

| | | | | |
|---|---|---|---|---|
| 5,394,137 | A * | 2/1995 | Orschek | B60T 17/221 |
| | | | | 340/453 |
| 5,572,187 | A * | 11/1996 | Williford | B60T 17/22 |
| | | | | 340/453 |
| 5,611,606 | A * | 3/1997 | Nell | B60T 8/266 |
| | | | | 303/115.2 |
| 5,892,437 | A * | 4/1999 | Scheibe | B60T 17/221 |
| | | | | 701/70 |
| 6,318,813 | B1 | 11/2001 | Goodell | |
| 7,089,815 | B2 * | 8/2006 | Fogelstrom | B60T 17/02 |
| | | | | 702/98 |
| 7,216,552 | B2 * | 5/2007 | Fogelstrom | B60T 17/221 |
| | | | | 73/862.326 |
| 2013/0304343 | A1 * | 11/2013 | Feyerabend | B60T 17/221 |
| | | | | 701/70 |

* cited by examiner

ABNORMAL DETECTING SYSTEM AND METHOD FOR A PNEUMATIC BRAKE

BACKGROUND

Technical Field

The present disclosure relates to a brake detecting system and method. More particularly, the present disclosure relates to an abnormal detecting system and method for a pneumatic brake that can clear fault or activate a backup system preliminary.

Description of Related Art

The reaction of a driver is not sufficient to handle an increasingly complicated driving environment, and thus driving safety is dramatically dependent on the reaction capability of each individual driver. A brake assist system is of such important that it has been dramatically developed to increase driving safety. Such a brake assist system commonly provides functionalities that remind the driver to turn off the power, activate the parking brake or cut off the electricity when a brake failure occurs. However, abnormal pressure phenomena when a vehicle traveling is not sufficiently studied.

The abnormal pressure is a main factor that causes brake failure of a van, a truck or a large vehicle, etc. Conventionally, the method used for determining abnormal pneumatic brake only detects the pressure of an air reservoir, and the backup scenario is only to increase assist air source, as those disclosed in Taiwan patent No. 1312324B. Another abnormal brake detecting method is to evaluate brake pedal strength and air reservoir pressure, as disclosed in U.S. Pat. No. 7,216,552B2. However, to a real vehicle driver, it's difficult to determine a front brake failure or a rear brake failure simply by the air source and the brake pedal, therefore, an emergency brake failure often occurs, thus the pneumatic brake will fail again or cannot be activated in time. Turnover of a vehicle is also commonly seen owing to an emergency brake failure.

Conventionally, a backup method is used to solve the aforementioned problem. However, the method that increases an air source will easily fail under an extreme situation. For example, in a situation of excessive vehicle speed or when two vehicles are too close, the aforementioned method cannot response to a brake position in time owing to the different activation mechanisms and positions of the air source, thus the vehicle speed cannot be decreased in time or the automatic brake cannot be activated in time, thereby a collision still occurs.

Furthermore, the aforementioned situation occurs frequently in a brake assist system that can only display warning messages to the driver. The driver cannot fully solve the brake failure situation using insufficient information and low response time. Therefore, there is a need to develop an abnormal detecting system for a pneumatic brake that can be applied in any failure situation. Furthermore, there is also a need to develop a brake backup system that can reduce the pneumatic brake failure of large vehicles.

SUMMARY

According to one aspect of the present disclosure, an abnormal detecting system is provided. The abnormal detecting system includes a pedal stroke sensor, a front brake chamber pressure sensor, a rear brake chamber pressure sensor, a storage unit pressure sensor, a parking brake switch and an abnormal detecting circuit. The pedal stroke sensor is connected to a brake pedal for outputting a pedal stroke signal. The front chamber pressure sensor is connected to a front brake for outputting a front chamber pressure signal. The rear chamber pressure sensor is connected to a rear brake for outputting a rear chamber pressure signal. The storage unit pressure sensor is connected to an air storage unit for outputting an air storage unit pressure. The parking brake switch is connected to a parking brake control valve for outputting a parking brake control signal. The abnormal detecting circuit is connected to the pedal stroke sensor, the front chamber pressure sensor, the rear chamber pressure sensor, the storage unit pressure sensor and the parking brake switch for receiving the pedal stroke signal, the front chamber pressure signal, the rear chamber pressure signal, the air storage unit pressure signal and the parking brake control signal. In which the abnormal detecting circuit compares the pedal stroke signal with the front chamber pressure signal or the rear chamber pressure signal and then outputs a first abnormal signal; and the abnormal detecting circuit compares the parking brake control signal and then outputs a second abnormal signal.

According to another aspect of the present disclosure, an abnormal detecting method for a pneumatic brake is provided. The abnormal detecting method for a pneumatic brake includes an abnormal pressure detecting procedure and a diaphragm abnormal detecting procedure. The abnormal pressure detecting procedure is provided for detecting a pedal stroke, a brake chamber pressure and an air source pressure, and outputting a first abnormal signal when an exception occurs. The diaphragm abnormal detecting procedure is provided for detecting a parking brake control valve, comparing an on/off (applied/released) state of the brake with the brake chamber pressure, and outputting a second abnormal signal when an exception occurs.

According to still another aspect of the present disclosure, an abnormal detecting system is provided. The abnormal detecting system includes a pedal stroke sensor, a front chamber pressure sensor, a rear chamber pressure sensor, a storage unit pressure sensor, a parking brake switch, an abnormal detecting circuit and a backup module. The pedal stroke sensor is connected to a brake pedal for outputting a pedal stroke signal. The front chamber pressure sensor is connected to a front brake for outputting a front chamber pressure signal. The rear chamber pressure sensor is connected to a rear brake for outputting a rear chamber pressure signal. The storage unit pressure sensor is connected to an air storage unit for outputting an air storage unit pressure. The parking brake switch is connected to a parking brake control valve for outputting a parking brake control signal. The abnormal detecting circuit is connected to the pedal stroke sensor, the front chamber pressure sensor, the rear chamber pressure sensor, the storage unit pressure sensor and the parking brake switch for receiving the pedal stroke signal, the front chamber pressure signal, the rear chamber pressure signal, the air storage unit pressure signal and the parking brake control signal. In which the abnormal detecting circuit compares the pedal stroke signal with the front chamber pressure signal or the rear chamber pressure signal and then outputs a first abnormal signal; and the abnormal detecting circuit compares the parking brake control signal and then outputs a second abnormal signal. The backup module is controlled for activating a backup brake when receiving the first abnormal signal or the second abnormal signal transmitted by the abnormal detecting circuit.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The present disclosure provides an abnormal detecting system for a pneumatic brake. The detecting system can detect a pedal stroke, a chamber pressure, an air storage unit pressure and a parking brake control signal, and compares signals of each of them by an abnormal detecting circuit. Therefore, accurate abnormal signals can be obtained, and failure situations of the brake can be accurately determined to efficiently clear the fault.

Figure 1:
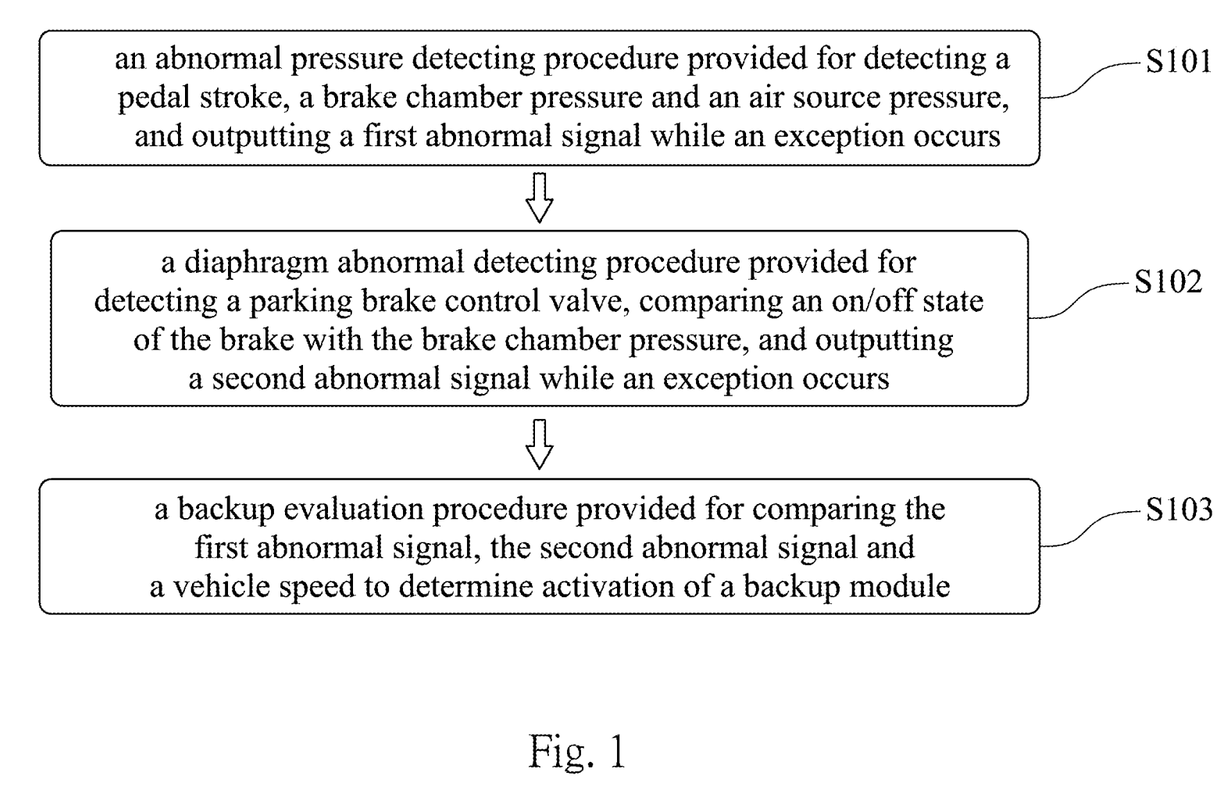
FIG. 1 is a flow chart showing an abnormal detecting method for a pneumatic brake according to one embodiment of the present disclosure.

FIG. 1 is a flow chart showing an abnormal detecting method for a pneumatic brake according to one embodiment of the present disclosure. The abnormal detecting method of the present disclosure mainly includes an abnormal pressure detecting procedure S101 and a diaphragm abnormal detecting procedure S102, and includes a backup evaluation procedure S103 in this embodiment.

In the abnormal pressure detecting procedure S101, first, a brake pedal stroke, a brake chamber pressure and an air source pressure is detected, and the brake pedal stroke is compared with the brake chamber pressure and the air source pressure. When an abnormal situation occurs, a first abnormal signal is output.

The diaphragm abnormal detecting procedure S102 is used for detecting a parking brake control signal and the brake chamber pressure. An on/off (applied or released) state of the parking brake is compared with the brake chamber pressure. When an abnormal situation occurs, a second abnormal signal is output. The parking brake is used for keeping a vehicle stationary when vehicle is parked or is left on a hill.

The backup evaluation procedure S103 is to detect the first abnormal signal, the second abnormal signal and a vehicle speed to determine if a backup is activated. By combining detecting the first abnormal signal, the second abnormal and the vehicle speed, more accurate analysis of an auxiliary brake or an emergency brake can be achieved. By the abnormal pressure detecting procedure S101 and the diaphragm abnormal detecting procedure S102, accurate abnormal signals can be obtained. An automatic detection and evaluation can be achieved by combining the backup evaluation procedure S103.

The aforementioned abnormal detecting method can include a warning procedure. The warning procedure is provided for generating a sound, a light or a vibration after comparing the first abnormal signal, the second abnormal signal and the vehicle speed.

Figure 2:
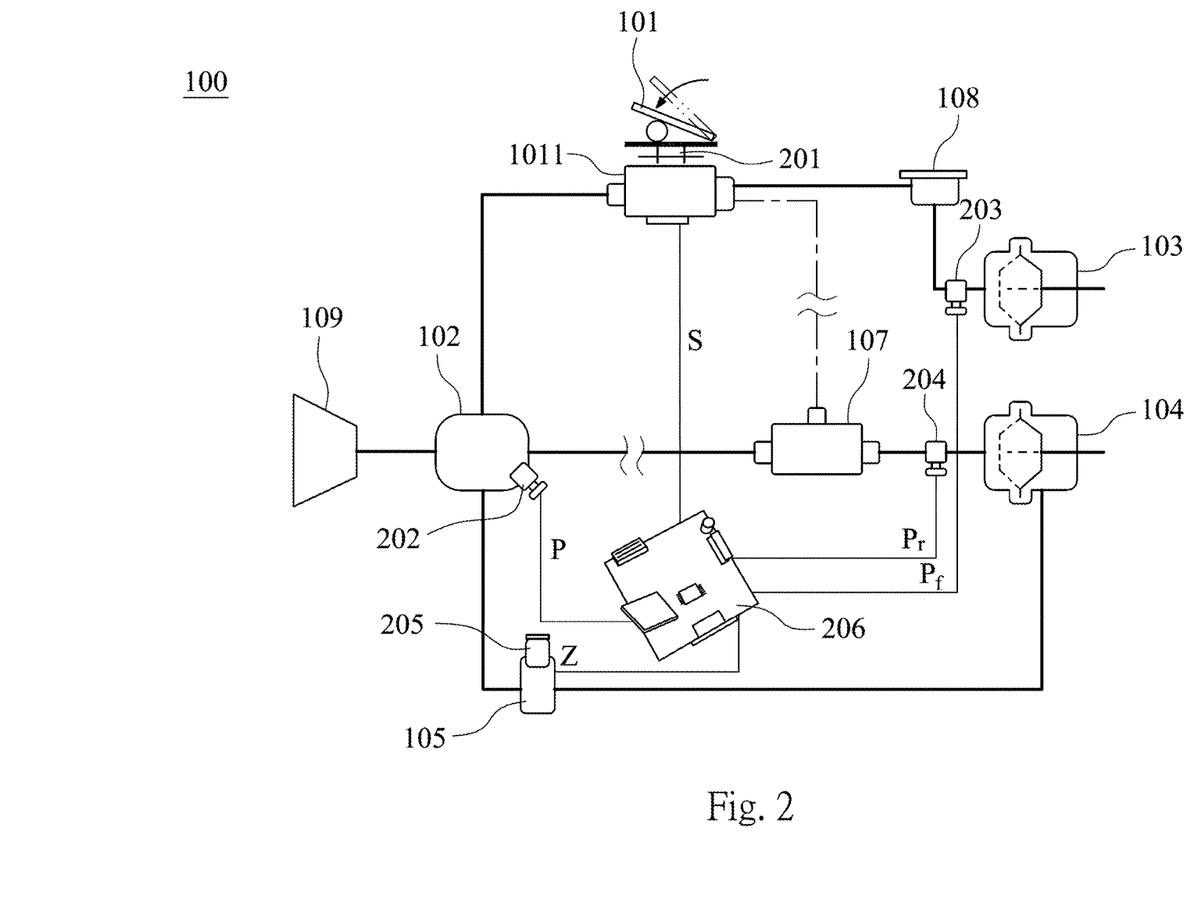
FIG. 2 is a schematic view showing an abnormal detecting system for a pneumatic brake according to one embodiment of the present disclosure.
Figure 3:
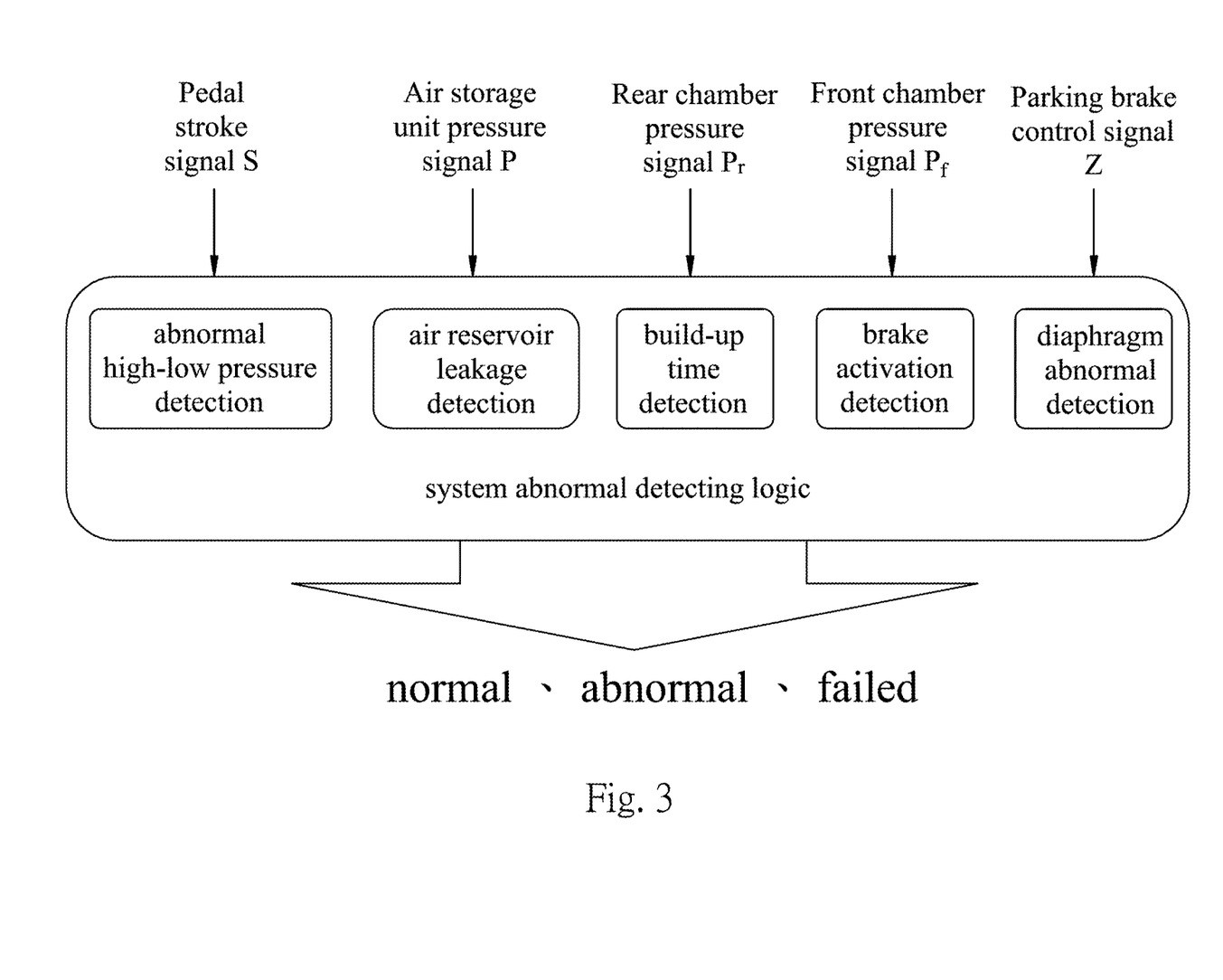
FIG. 3 is a logical diagram showing an abnormal detecting of the abnormal detecting system of FIG. 2.
Figure 4:
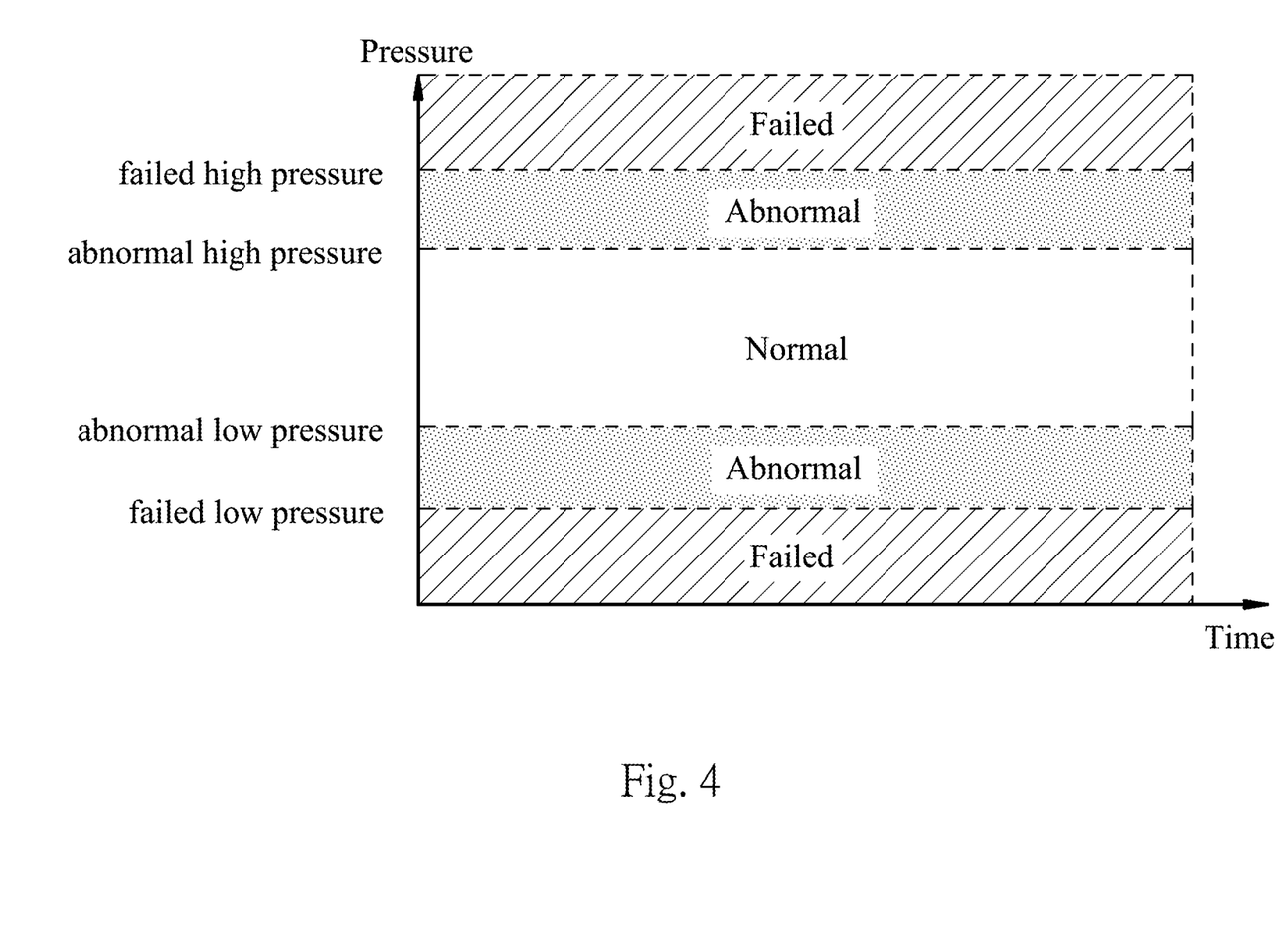
FIG. 4 is a comparative diagram showing a comparison of an air storage unit pressure sensor of FIG. 2.
Figure 5:
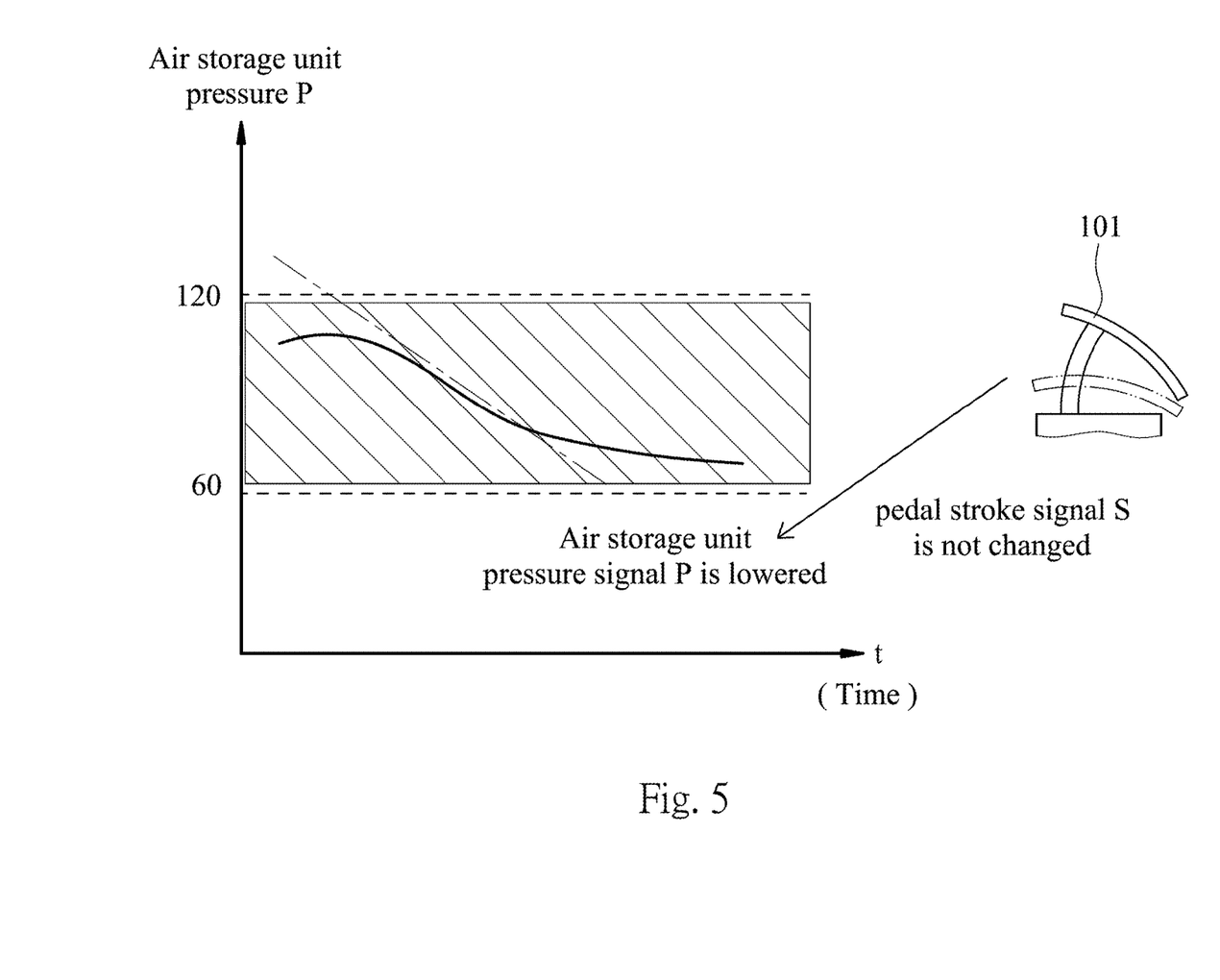
FIG. 5 is a comparative diagram showing a comparison of a pedal stroke sensor and an air storage unit pressure sensor of FIG. 2.
Figure 6:
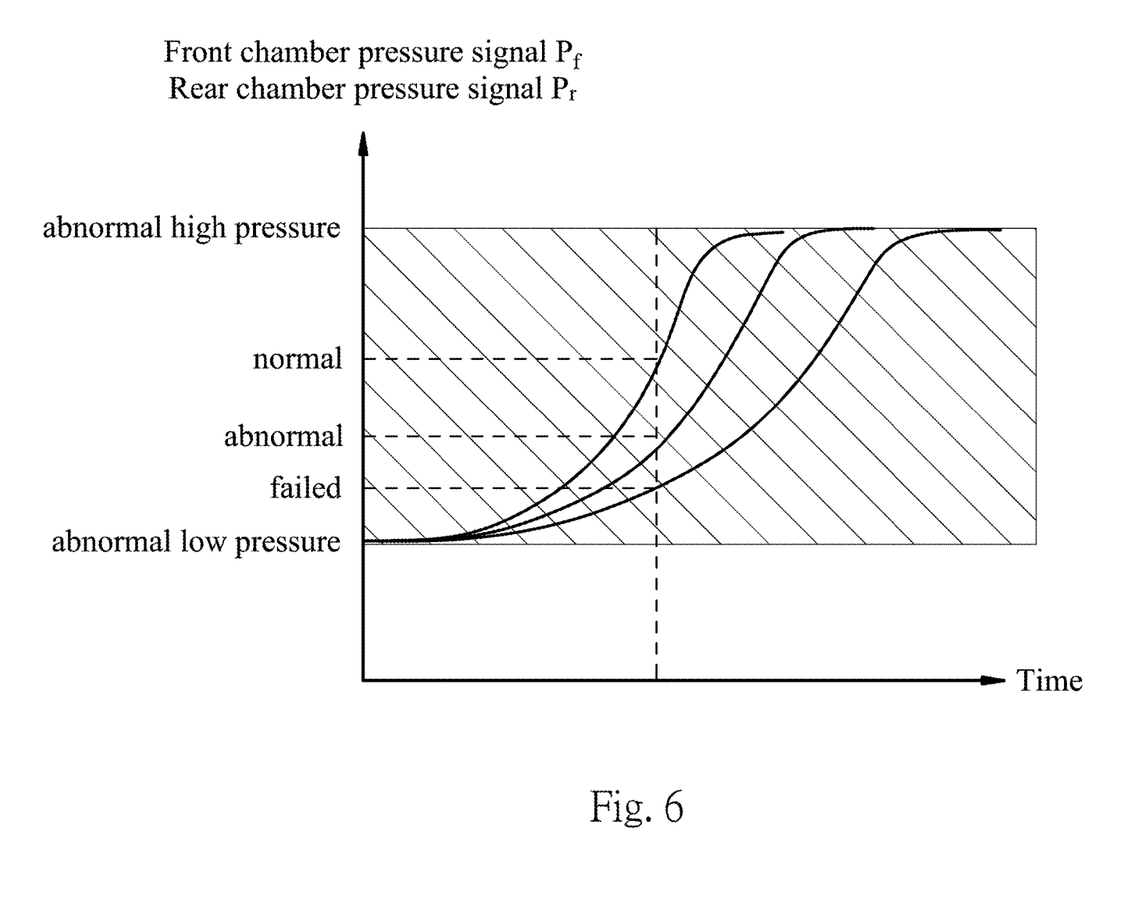
FIG. 6 is a comparative diagram showing a comparison of a pressure build-up time of a front chamber pressure sensor or a rear chamber pressure sensor of FIG. 2.
Figure 7:
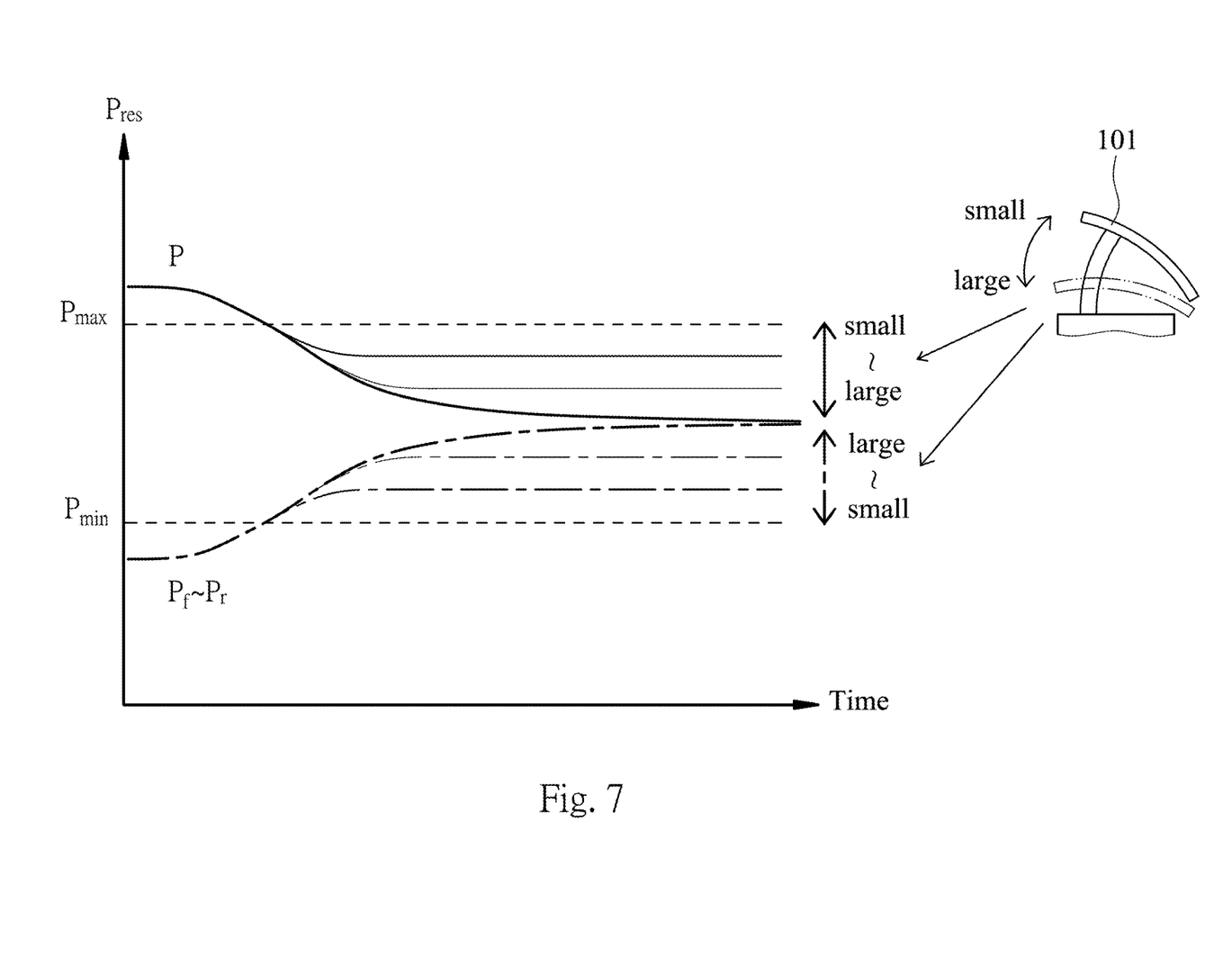
FIG. 7 is a comparative diagram showing a comparison between the pedal stroke sensor and the front chamber pressure sensor or a rear chamber pressure sensor of FIG. 2.
Figure 8:
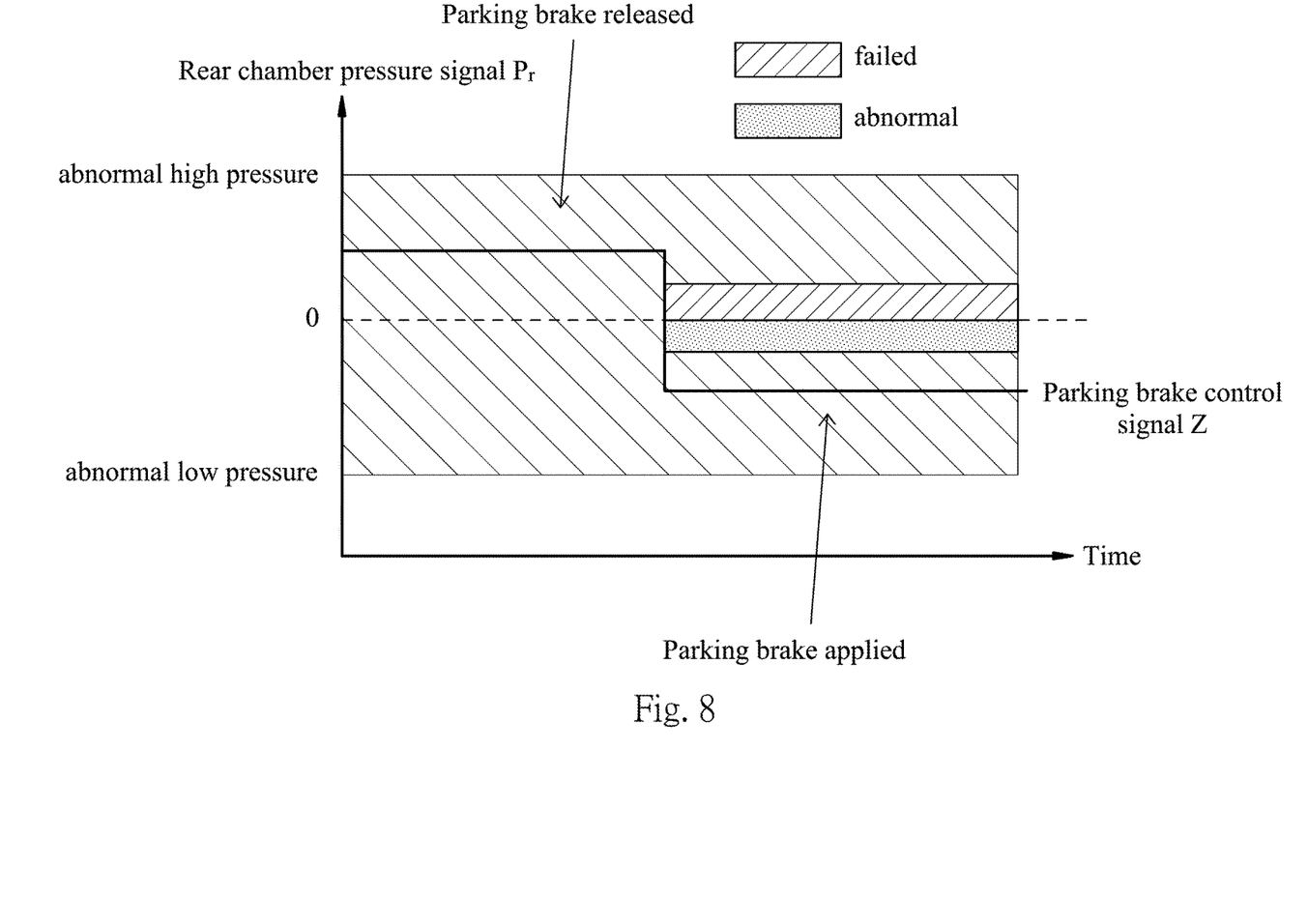
FIG. 8 is a comparative diagram showing a comparison between the rear chamber pressure sensor and a parking control signal of FIG. 2.

FIG. 2 is a schematic view showing an abnormal detecting system for a pneumatic brake according to one embodiment of the present disclosure; FIG. 3 is a logical diagram showing an abnormal detecting of the abnormal detecting system of FIG. 2; FIG. 4 is a comparative diagram showing a comparison of an air storage unit pressure sensor 202 of FIG. 2; FIG. 5 is a comparative diagram showing a comparison of a pedal stroke sensor 201 and the air storage unit pressure sensor 202 of FIG. 2; FIG. 6 is a comparative diagram showing a comparison of a pressure build-up time of a front chamber pressure sensor 203 or a rear chamber pressure sensor 204 of FIG. 2. FIG. 7 is a comparative diagram showing a comparison between the pedal stroke sensor 201 and the front chamber pressure sensor 203 or the rear chamber pressure sensor 204 of FIG. 2; and FIG. 8 is a comparative diagram showing a comparison between the rear chamber pressure sensor 204 and a parking control signal 105 of FIG. 2.

An abnormal detecting system 100 for a pneumatic brake of the present disclosure includes a pedal stroke 101, a pedal stroke sensor 201, an air storage unit 102, an air storage unit pressure sensor 202, a front brake chamber 103, a front chamber pressure sensor 203, a rear brake chamber 104, a rear chamber pressure sensor 204, a parking brake control valve 105, a parking brake switch 205, an abnormal detecting circuit 206, a relay valve 107, a quick release valve 108 and an air compressor 109.

The air compressor 109 is connected to the air storage unit 102, and the air storage unit 102 is connected to a treadle valve 1011, the relay valve 107 and the parking brake control valve 105. The treadle valve 1011 provides a brake pressure to the front brake chamber 103 through the quick release valve 108. The relay valve 107 is connected to the treadle valve 1011 and provides a brake pressure to the rear brake chamber 104. The rear brake chamber 104 is also connected to the parking brake control valve 105.

The abnormal detecting circuit 206 is electrically connected to the pedal stroke sensor 201, the air storage unit pressure sensor 202, the front chamber pressure sensor 203, the rear chamber pressure sensor 204 and the parking brake switch 205. In one example, the abnormal detecting circuit 206 can be a part of an Electronic Control Unit (ECU).

The brake pedal stroke sensor 201 is connected to the brake pedal 101 for outputting a pedal stroke signal S to the abnormal detecting circuit 206. The front chamber pressure sensor 203 is connected to the front brake chamber 103 for outputting a front chamber pressure signal Pf. The rear chamber pressure sensor 204 is connected to the rear brake chamber 104 for outputting a rear chamber pressure signal Pr. The air storage unit pressure sensor 202 is connected to the air storage unit 102 for outputting an air storage unit pressure signal P. The parking brake switch 205 is connected to the parking brake control valve 105 for outputting a parking brake control signal Z to the abnormal detecting circuit 206. In detail, the abnormal detecting circuit 206 receives the parking brake control signal Z, the pedal stroke signal S, the front chamber pressure signal Pf, the rear chamber pressure signal Pr and the air storage unit pressure signal P.

FIG. 3 shows detecting logic of the abnormal detecting circuit 206 of the present disclosure. FIGS. 4 to 8 show methods that detect and determine normal situations, abnormal situations or failure situations according to various embodiments of the present disclosure.

FIG. 4 shows that the air storage unit pressure sensor 202 (referred to FIG. 2) is used for detecting if in a normal pressure situation. The abnormal detecting circuit 206 can receive the front chamber pressure, the rear chamber pressure and the air storage unit pressure through the front chamber pressure sensor, the rear chamber pressure sensor and the air storage unit pressure sensor, and determines the distribution of the high-low pressure. The pressure distribution can be classified to three situations: normal, abnormal or failure.

FIG. 5 shows a comparison of the pedal stroke sensor 201 and the air storage unit pressure sensor 202. The abnormal detecting circuit 206 can compare the pedal stroke signal S and the air storage unit pressure signal P to determine if the air storage unit 102 is leaked.

FIG. 6 shows a comparison of the pressure build-up time of the front chamber pressure sensor 203 and the rear chamber pressure sensor 204. The abnormal detecting circuit 206 can compare the pedal stroke signal S, the front chamber pressure signal Pf and the rear chamber pressure signal Pr to determine the pressure build-up time.

FIG. 7 shows a comparison of the pedal stroke sensor 201, the air storage unit pressure sensor 202, the front chamber pressure sensor 203 and the rear chamber pressure sensor 204. The abnormal detecting circuit 206 can receive the pedal stroke signal S, the front chamber pressure signal Pf, the rear chamber pressure signal Pr and the air storage unit pressure P, and then determine if an abnormal situation occurs according to the brake activation pressure-time distribution of FIG. 7. Then the pedal stroke signal S is compared with the front chamber pressure signal Pf or the rear chamber pressure signal Pr, and a first abnormal signal is output according to the brake activation pressure-time distribution of FIG. 7.

FIG. 8 shows a comparison of the parking brake switch 205 and a control signal of the parking brake control valve 105. The abnormal detecting circuit 206 receives the parking brake control signal Z of the parking brake switch 205, and compares the parking brake control signal Z with an on/off (applied or released) state of the parking brake control valve 105. Then a positive pressure situation or a negative pressure situation can be determined by evaluating the rear chamber pressure signal Pr, thereby determining if the diaphragm of the rear chamber is abnormal or failed, and outputting a second abnormal signal.

In the aforementioned abnormal detecting system of a pneumatic brake, the abnormal detecting circuit 206 can receive the first abnormal signal, the second abnormal signal, the vehicle speed and other factors, and can cooperate with the other part of the ECU for controlling the auxiliary brake action and devices of the vehicle.

Figure 9:
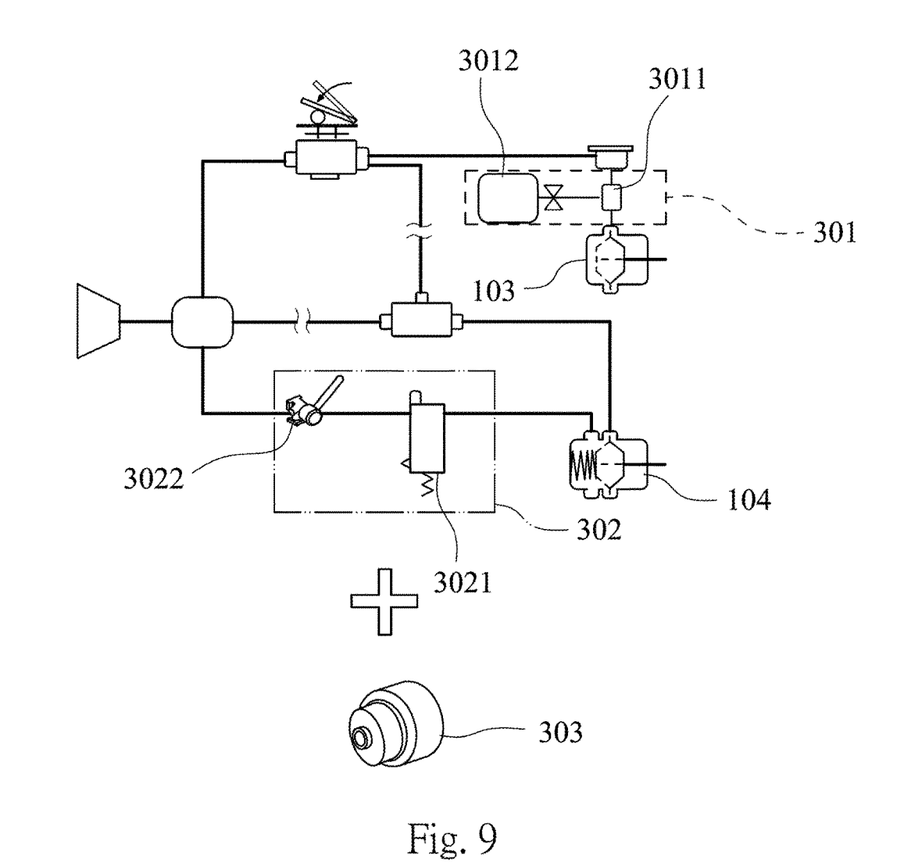
FIG. 9 is a schematic showing an abnormal detecting system for a pneumatic brake which has backup functionality according to another embodiment of the present disclosure.

FIG. 9 is a schematic showing an abnormal detecting system for a pneumatic brake which has backup functionality according to another embodiment of the present disclosure. In FIG. 9, three backup modules 301~303 are added, the other components of the abnormal detecting system are similar to those in the aforementioned embodiments, and are not described herein again. The three backup modules 301~303 can cooperate with an abnormal detecting circuit (now shown) to determine if a backup brake is activated. The backup modules 301~303 can receive the first abnormal signal, the second abnormal signal or the other signals, and then compare the first abnormal signal, the second abnormal signal and a vehicle speed to determine turning on/off the backup modules 301~303, then an automatic or manual brake can be activated.

The backup module 301 is connected to the front brake chamber 103, and the backup module 301 includes a backup solenoid valve 3011 and a backup air reservoir 3012. The backup solenoid valve 3011 can be controlled by the abnormal detecting circuit to turn on/off the backup air reservoir 3012, thereby supplying air to the front brake chamber 103 for activating a backup brake.

The backup module 302 is connected to the rear brake chamber 104, and the backup module 302 includes a backup solenoid valve 3012 and a manual valve 3022. The solenoid valve 3012 can be controlled by the abnormal detecting circuit for properly releasing the pressure of the parking brake, thereby the spring-loaded parking brake can be applied to the rear axle for activating a backup brake.

The backup module is a regenerative brake. The regenerative brake is coupled to the powertrain (drive wheel or drive shaft) of a vehicle, and then an auxiliary braking force can be provided by the regenerative brake.

In sum, the abnormal detecting system of a pneumatic brake of the present disclosure has advantages of accurate analysis, high response speed and customized backup and can be applied in various kinds of situations, therefore driving safety can be enhanced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An abnormal detecting system for a pneumatic brake, the abnormal detecting system comprising:
   a pedal stroke sensor connected to a brake pedal for outputting a pedal stroke signal;
   a front chamber pressure sensor connected to a front brake for outputting a front chamber pressure signal;
   a rear chamber pressure sensor connected to a rear brake for outputting a rear chamber pressure signal;
   a storage unit pressure sensor connected to an air storage unit for outputting an air storage unit pressure signal;
   a parking brake switch connected to a parking brake control valve for outputting a parking brake control signal; and
   an abnormal detecting circuit connected to the pedal stroke sensor, the front chamber pressure sensor, the rear chamber pressure sensor, the storage unit pressure sensor and the parking brake switch for receiving the pedal stroke signal, the front chamber pressure signal, the rear chamber pressure signal, the air storage unit pressure signal and the parking brake control signal;
   wherein the abnormal detecting circuit compares the pedal stroke signal with the front chamber pressure signal or the rear chamber pressure signal and then outputs a first abnormal signal; and the abnormal detecting circuit compares the parking brake control signal with an on/off state of the parking brake control valve and then outputs a second abnormal signal.

2. The abnormal detecting system of claim 1, further comprising:
   a quick release valve connected between the brake pedal and the front brake, and the front chamber pressure sensor connected between the quick release valve and the front brake;
   a relay valve connected between the air storage unit, the brake pedal and the rear brake, and the rear chamber pressure sensor connected between the relay valve and the rear brake.

3. The abnormal detecting system of claim 1, wherein the abnormal detecting circuit is an Electronic Control Unit (ECU).

4. An abnormal detecting method for a pneumatic brake, the abnormal detecting method comprising:
   an abnormal pressure detecting procedure provided for detecting a pedal stroke, a brake chamber pressure and an air source pressure, and outputting a first abnormal signal when a first exception occurs;
   a diaphragm abnormal detecting procedure provided for detecting a parking brake control valve, comparing an on/off state of a parking brake with the brake chamber pressure, and outputting a second abnormal signal when a second exception occurs; and
   a backup evaluation procedure provided for comparing the first abnormal signal, the second abnormal signal and a vehicle speed to determine activation of a backup module.

5. The abnormal detecting method of claim 4, further comprising:
   a warning procedure provided for generating a sound, a light or a vibration after comparing the first abnormal signal, the second abnormal signal and a vehicle speed.

6. An abnormal detecting system for a pneumatic brake, the detecting system comprising:
   a pedal stroke sensor connected to a brake pedal for outputting a pedal stroke signal;
   a front chamber pressure sensor connected to a front brake for outputting a front chamber pressure signal;
   a rear chamber pressure sensor connected to a rear brake for outputting a rear chamber pressure signal;
   a storage unit pressure sensor connected to an air storage unit for outputting an air storage unit pressure signal;
   a parking brake switch of a parking brake connected to a parking brake control valve for outputting a parking brake control signal;
   an abnormal detecting circuit connected to the pedal stroke sensor, the front chamber pressure sensor, the rear chamber pressure sensor, the storage unit pressure sensor and the parking brake switch for receiving the pedal stroke signal, the front chamber pressure signal, the rear chamber pressure signal, the air storage unit pressure signal and the parking brake control signal; wherein the abnormal detecting circuit compares the pedal stroke signal with the front chamber pressure signal or the rear chamber pressure signal and then outputs a first abnormal signal; and the abnormal detecting circuit compares the parking brake control signal with an on/off state of the parking brake control valve and then outputs a second abnormal signal; and
   a backup module controlled for activating a backup brake when receiving the first abnormal signal or the second abnormal signal transmitted by the abnormal detecting circuit.

7. The abnormal detecting system of claim 6, wherein the backup module connects the front brake, the rear brake or the parking brake switch.

8. The abnormal detecting system of claim 7, wherein the backup module comprises a backup solenoid valve and a backup air reservoir, the backup solenoid valve is controlled by the abnormal detecting circuit to open or close the backup air reservoir.

9. The abnormal detecting system of claim 6, wherein the backup module comprises a backup solenoid valve and a manual valve, the backup solenoid valve is controlled by the abnormal detecting circuit to activate the parking brake.

10. The abnormal detecting system of claim 6, wherein the backup module comprises a regenerative brake and the regenerative brake is configured to perform an auxiliary brake.

11. The abnormal detecting system of claim 6, wherein the abnormal detecting system comprises a plurality of backup modules.

12. The abnormal detecting system of claim 11, wherein the abnormal detecting system comprises two backup modules, and the two backup modules are disposed on the front brake and the parking brake.

13. The abnormal detecting system of claim 11, wherein the abnormal detecting system comprises three backup modules, and the three backup modules are disposed on the front brake, the parking brake and a driving axle.

* * * * *